(12) United States Patent
Kasuga

(10) Patent No.: US 11,003,922 B2
(45) Date of Patent: May 11, 2021

(54) PERIPHERAL RECOGNITION DEVICE, PERIPHERAL RECOGNITION METHOD, AND COMPUTER READABLE MEDIUM

(71) Applicant: Mitsubishi Electric Corporation, Tokyo (JP)

(72) Inventor: Takafumi Kasuga, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 169 days.

(21) Appl. No.: 16/080,926

(22) PCT Filed: Apr. 20, 2016

(86) PCT No.: PCT/JP2016/062558
§ 371 (c)(1),
(2) Date: Aug. 29, 2018

(87) PCT Pub. No.: WO2017/183141
PCT Pub. Date: Oct. 26, 2017

(65) Prior Publication Data
US 2019/0042863 A1 Feb. 7, 2019

(51) Int. Cl.
*G06K 9/00* (2006.01)
*G08G 1/16* (2006.01)

(52) U.S. Cl.
CPC ..... *G06K 9/00805* (2013.01); *G06K 9/00798* (2013.01); *G06K 9/00825* (2013.01); *G08G 1/16* (2013.01); *G06K 2209/23* (2013.01)

(58) Field of Classification Search
CPC ........... G06K 9/00805; G06K 9/00798; G06K 9/00825; G06K 2209/23; G08G 1/16
(Continued)

(56) References Cited

U.S. PATENT DOCUMENTS 6,657,581 B1 12/2003 Lippert et al.
6,970,142 B1 11/2005 Pleva et al.
(Continued)

FOREIGN PATENT DOCUMENTS

CN 103108152 A 5/2013
DE 198 45 568 A1 10/1999
(Continued)

OTHER PUBLICATIONS

International Search Report (PCT/ISA/210) issued in PCT/JP2016/062558, dated Aug. 2, 2016.
(Continued)

*Primary Examiner* — Catherine T. Rastovski
*Assistant Examiner* — Aeysha N Sultana
(74) *Attorney, Agent, or Firm* — Birch, Stewart, Kolasch & Birch, LLP

(57) ABSTRACT

A control unit (21) determines an allocation rate of computational resources to be allocated to each of a plurality of sensing processes of analyzing sensor data output from a plurality of sensors that observe an area around a moving body (100), based on a moving environment of the moving body (100), such as the type of a road where the moving body (100) travels, behavior of the moving body (100), and visibility from the moving body (100). A detection unit (22) detects an object in the area around the moving body (100) by using, for a corresponding sensing process, computational resources of an allocated amount specified based on the allocation rate determined by the control unit (21).

9 Claims, 13 Drawing Sheets

(58) Field of Classification Search
USPC .................................................. 702/188
See application file for complete search history.

(56) References Cited

U.S. PATENT DOCUMENTS

| | | | | |
|---|---|---|---|---|
| 8,860,564 | B2* | 10/2014 | Rubin | G08G 1/0969 340/436 |
| 2002/0044082 | A1 | 4/2002 | Woodington et al. | |
| 2002/0067287 | A1 | 6/2002 | Delcheccolo et al. | |
| 2002/0067305 | A1 | 6/2002 | LeBlanc et al. | |
| 2002/0072843 | A1 | 6/2002 | Russell et al. | |
| 2002/0075138 | A1 | 6/2002 | Van Rees et al. | |
| 2002/0075178 | A1 | 6/2002 | Woodington et al. | |
| 2002/0147534 | A1 | 10/2002 | Delcheccolo et al. | |
| 2002/0163478 | A1 | 11/2002 | Pleva et al. | |
| 2002/0190891 | A1 | 12/2002 | Viana et al. | |
| 2003/0001772 | A1 | 1/2003 | Woodington et al. | |
| 2003/0004633 | A1 | 1/2003 | Russell et al. | |
| 2003/0011519 | A1 | 1/2003 | Breglia et al. | |
| 2003/0098816 | A1 | 5/2003 | Pleva et al. | |
| 2003/0210172 | A1 | 11/2003 | Pleva et al. | |
| 2003/0210182 | A1 | 11/2003 | Hanson et al. | |
| 2004/0027305 | A1 | 2/2004 | Pleva et al. | |
| 2004/0155812 | A1 | 8/2004 | Pleva et al. | |
| 2004/0246170 | A1 | 12/2004 | Woodington et al. | |
| 2004/0257266 | A1 | 12/2004 | Pleva et al. | |
| 2005/0179582 | A1 | 8/2005 | Woodington et al. | |
| 2005/0235288 | A1* | 10/2005 | Yamakabe | G06F 9/5072 718/100 |
| 2006/0117297 | A1 | 6/2006 | Janssen | |
| 2008/0312833 | A1* | 12/2008 | Greene | G08G 1/165 701/301 |
| 2009/0204289 | A1 | 8/2009 | Lehre et al. | |
| 2012/0065841 | A1 | 3/2012 | Nagata et al. | |
| 2012/0182160 | A1* | 7/2012 | Hod | G08G 1/0116 340/934 |
| 2012/0216208 | A1 | 8/2012 | Takemura et al. | |
| 2012/0221207 | A1 | 8/2012 | Nakamura | |
| 2014/0270378 | A1* | 9/2014 | Aimura | G06K 9/00805 382/103 |
| 2016/0012282 | A1* | 1/2016 | Shima | H04N 7/188 382/103 |
| 2019/0268915 | A1* | 8/2019 | Li | H04W 74/08 |

FOREIGN PATENT DOCUMENTS

| | | |
|---|---|---|
| DE | 102 38 936 A1 | 3/2004 |
| JP | 2000-57494 A | 2/2000 |
| JP | 2004-45320 A | 2/2004 |
| JP | 2004-506908 A | 3/2004 |
| JP | 2008-310805 A | 12/2008 |
| JP | 2009-510553 A | 3/2009 |
| JP | 2011-70411 A | 4/2011 |
| JP | 2011-100338 A | 5/2011 |
| JP | 2012-221031 A | 11/2012 |
| WO | WO 2008/015891 A1 | 2/2008 |
| WO | WO 2010/140239 A1 | 12/2010 |
| WO | WO 2014/132747 A1 | 9/2014 |

OTHER PUBLICATIONS

Notification of Reasons for Refusal issued in Japanese Patent Application No. 2016-570060, dated Apr. 4, 2017.
Office Action dated Jun. 12, 2019 received in corresponding German Application No. 11 2016 006 616.3.
Zoratti, P.: FPGAs: Effektive Prozessor-Plattform fur Fahrerassistenzsysteme. Aug. 26, 2011.
Office Action dated Oct. 5, 2020 in corresponding German Application No. 11 2016 006 616.3.
Office Action dated Sep. 17, 2020 in corresponding Chinese Application No. 201680084618.8.

* cited by examiner

Fig. 5      411

| SENSING AREA | CLASS | CYCLE [ms] | RANGE [m] | RESOLUTION | ALLOCATION RATE [%] |
|---|---|---|---|---|---|
| FRONT SENSING | A | 100 | 50 | MODERATE | 10 |
| | B | 100 | 50 | HIGH | 14 |
| | C | 100 | 100 | MODERATE | 14 |
| | D | 100 | 100 | HIGH | 18 |
| | E | 100 | 150 | MODERATE | 18 |
| | F | 100 | 150 | HIGH | 22 |
| | G | 50 | 50 | MODERATE | 22 |
| | H | 50 | 50 | HIGH | 26 |
| | I | 50 | 100 | MODERATE | 26 |
| | J | 50 | 100 | HIGH | 30 |
| | K | 50 | 150 | MODERATE | 30 |
| | L | 50 | 150 | HIGH | 34 |
| LEFT SENSING | A | 100 | 20 | MODERATE | 6 |
| | B | 100 | 20 | HIGH | 10 |
| | C | 100 | 30 | MODERATE | 10 |
| | D | 100 | 30 | HIGH | 14 |
| | E | 100 | 40 | MODERATE | 14 |
| | F | 100 | 40 | HIGH | 18 |
| | G | 50 | 20 | MODERATE | 14 |
| | H | 50 | 20 | HIGH | 18 |
| | I | 50 | 30 | MODERATE | 18 |
| | J | 50 | 30 | HIGH | 22 |
| | K | 50 | 40 | MODERATE | 22 |
| | L | 50 | 40 | MODERATE | 26 |
| RIGHT SENSING | A | 100 | 20 | MODERATE | 6 |
| | B | 100 | 20 | HIGH | 10 |
| | C | 100 | 40 | MODERATE | 10 |
| | D | 100 | 40 | HIGH | 14 |
| | E | 100 | 20 | MODERATE | 14 |
| | F | 100 | 20 | HIGH | 18 |
| | G | 50 | 40 | MODERATE | 14 |
| | H | 50 | 40 | HIGH | 18 |
| | I | 50 | 50 | MODERATE | 18 |
| | J | 50 | 50 | HIGH | 22 |
| | K | 50 | 100 | MODERATE | 22 |
| | L | 50 | 100 | HIGH | 26 |
| REAR SENSING | A | 100 | 50 | MODERATE | 8 |
| | B | 100 | 50 | HIGH | 12 |
| | C | 100 | 100 | MODERATE | 12 |
| | D | 100 | 100 | HIGH | 16 |
| | E | 100 | 150 | MODERATE | 16 |
| | F | 100 | 150 | HIGH | 20 |
| | G | 50 | 50 | MODERATE | 18 |
| | H | 50 | 50 | HIGH | 22 |
| | I | 50 | 100 | MODERATE | 22 |
| | J | 50 | 100 | HIGH | 26 |
| | K | 50 | 150 | MODERATE | 28 |
| | L | 50 | 150 | HIGH | 30 |

| PROCESSING CLASS | ROAD TYPE | TRAVELING STATE | VISIBILITY | FRONT SENSING | | LEFT SENSING | | RIGHT SENSING | | REAR SENSING | | TOTAL |
|---|---|---|---|---|---|---|---|---|---|---|---|---|
| | | | | CLASS | AMOUNT OF COMPUTATIONAL RESOURCES | CLASS | AMOUNT OF COMPUTATIONAL RESOURCES | CLASS | AMOUNT OF COMPUTATIONAL RESOURCES | CLASS | AMOUNT OF COMPUTATIONAL RESOURCES | |
| 1 | LOCAL ROAD | STRAIGHT | GOOD | C | 14 | A | 6 | A | 6 | C | 12 | 38 |
| 2 | LOCAL ROAD | INTERSECTION | GOOD | A | 10 | C | 10 | C | 10 | A | 8 | 38 |
| 3 | LOCAL ROAD | STRAIGHT | POOR | D | 18 | B | 10 | B | 10 | D | 16 | 54 |
| 4 | LOCAL ROAD | INTERSECTION | POOR | B | 14 | D | 14 | D | 14 | B | 12 | 54 |
| 5 | EXPRESSWAY | STRAIGHT | GOOD | I | 26 | G | 14 | G | 14 | G | 18 | 72 |
| 6 | EXPRESSWAY | MERGING | GOOD | I | 26 | I | 18 | I | 18 | I | 22 | 84 |
| 7 | EXPRESSWAY | STRAIGHT | POOR | J | 30 | H | 18 | J | 18 | H | 22 | 88 |
| 8 | EXPRESSWAY | MERGING | POOR | J | 30 | J | 22 | J | 22 | J | 26 | 100 |

Fig. 12

| SENSING AREA | CLASS | CYCLE [ms] | RANGE [m] | RESOLUTION | ALLOCATION RATE [%] | UPDATE TIME [ms] |
|---|---|---|---|---|---|---|
| FRONT SENSING | A | 100 | 50 | MODERATE | 10 | 3 |
| | B | 100 | 50 | HIGH | 14 | 5 |
| | C | 100 | 100 | MODERATE | 14 | 5 |
| | D | 100 | 100 | HIGH | 18 | 8 |
| | E | 100 | 150 | MODERATE | 18 | 8 |
| | F | 100 | 150 | HIGH | 22 | 10 |
| | G | 50 | 50 | MODERATE | 22 | 10 |
| | H | 50 | 50 | HIGH | 26 | 13 |
| | I | 50 | 100 | MODERATE | 26 | 13 |
| | J | 50 | 100 | HIGH | 30 | 15 |
| | K | 50 | 150 | MODERATE | 30 | 15 |
| | L | 50 | 150 | HIGH | 34 | 18 |
| LEFT SENSING | A | 100 | 20 | MODERATE | 6 | 2 |
| | B | 100 | 20 | HIGH | 10 | 4 |
| | C | 100 | 30 | MODERATE | 10 | 4 |
| | D | 100 | 30 | HIGH | 14 | 6 |
| | E | 100 | 40 | MODERATE | 14 | 6 |
| | F | 100 | 40 | HIGH | 18 | 9 |
| | G | 50 | 20 | MODERATE | 14 | 8 |
| | H | 50 | 20 | HIGH | 18 | 9 |
| | I | 50 | 30 | MODERATE | 18 | 9 |
| | J | 50 | 30 | HIGH | 22 | 11 |
| | K | 50 | 40 | MODERATE | 22 | 11 |
| | L | 50 | 40 | MODERATE | 26 | 13 |
| RIGHT SENSING | A | 100 | 20 | MODERATE | 6 | 2 |
| | B | 100 | 20 | HIGH | 10 | 4 |
| | C | 100 | 40 | MODERATE | 10 | 4 |
| | D | 100 | 40 | HIGH | 14 | 6 |
| | E | 100 | 20 | MODERATE | 14 | 6 |
| | F | 100 | 20 | HIGH | 18 | 9 |
| | G | 50 | 40 | MODERATE | 14 | 8 |
| | H | 50 | 40 | HIGH | 18 | 9 |
| | I | 50 | 50 | MODERATE | 18 | 9 |
| | J | 50 | 50 | HIGH | 22 | 11 |
| | K | 50 | 100 | MODERATE | 22 | 11 |
| | L | 50 | 100 | HIGH | 26 | 13 |
| REAR SENSING | A | 100 | 50 | MODERATE | 8 | 2 |
| | B | 100 | 50 | HIGH | 12 | 4 |
| | C | 100 | 100 | MODERATE | 12 | 4 |
| | D | 100 | 100 | HIGH | 16 | 7 |
| | E | 100 | 150 | MODERATE | 16 | 7 |
| | F | 100 | 150 | HIGH | 20 | 10 |
| | G | 50 | 50 | MODERATE | 18 | 9 |
| | H | 50 | 50 | HIGH | 22 | 12 |
| | I | 50 | 100 | MODERATE | 22 | 12 |
| | J | 50 | 100 | HIGH | 26 | 15 |
| | K | 50 | 150 | MODERATE | 26 | 15 |
| | L | 50 | 150 | HIGH | 30 | 17 |

| SENSING AREA | CLASS | CONFIGURATION |
|---|---|---|
| FRONT SENSING | A | CIRCUIT 1 |
| | B | CIRCUIT 2 |
| | C | CIRCUIT 3 |
| | D | CIRCUIT 4 |
| | E | CIRCUIT 5 |
| | F | CIRCUIT 6 |
| | G | CIRCUIT 7 |
| | H | CIRCUIT 8 |
| | I | CIRCUIT 9 |
| | J | CIRCUIT 10 |
| | K | CIRCUIT 11 |
| | L | CIRCUIT 12 |
| LEFT SENSING | A | CIRCUIT 13 |
| | B | CIRCUIT 14 |
| | C | CIRCUIT 15 |
| | D | CIRCUIT 16 |
| | E | CIRCUIT 17 |
| | F | CIRCUIT 18 |
| | G | CIRCUIT 19 |
| | H | CIRCUIT 20 |
| | I | CIRCUIT 21 |
| | J | CIRCUIT 22 |
| | K | CIRCUIT 23 |
| | L | CIRCUIT 24 |
| RIGHT SENSING | A | CIRCUIT 25 |
| | B | CIRCUIT 26 |
| | C | CIRCUIT 27 |
| | D | CIRCUIT 28 |
| | E | CIRCUIT 29 |
| | F | CIRCUIT 30 |
| | G | CIRCUIT 31 |
| | H | CIRCUIT 32 |
| | I | CIRCUIT 33 |
| | J | CIRCUIT 34 |
| | K | CIRCUIT 35 |
| | L | CIRCUIT 36 |
| REAR SENSING | A | CIRCUIT 37 |
| | B | CIRCUIT 38 |
| | C | CIRCUIT 39 |
| | D | CIRCUIT 40 |
| | E | CIRCUIT 41 |
| | F | CIRCUIT 42 |
| | G | CIRCUIT 43 |
| | H | CIRCUIT 44 |
| | I | CIRCUIT 45 |
| | J | CIRCUIT 46 |
| | K | CIRCUIT 47 |
| | L | CIRCUIT 48 |

PERIPHERAL RECOGNITION DEVICE, PERIPHERAL RECOGNITION METHOD, AND COMPUTER READABLE MEDIUM

TECHNICAL FIELD

The present invention relates to a technique of recognizing an object present in an area around a moving body.

BACKGROUND ART

Advanced driver-assistance systems such as a lane departure warning system (LDW), a pedestrian detection system (PD), and an adaptive cruise control system (ACC) are being developed or commercialized with the purpose of supporting driving of drivers and of preventive safety. Furthermore, autonomous driving systems which perform driving instead of drivers all or part of the way to the destination are being developed.

The advanced driver-assistance systems and the autonomous driving systems are realized based on the state of an area around a vehicle recognized by a sensor or the like. Accordingly, to increase the accuracy of the advanced driver-assistance systems and the autonomous driving systems, the state of the area around a vehicle has to be accurately recognized.

Generally, according to a sensing process of analyzing sensor data output by a sensor, a large amount of computational resources is necessary to increase detection accuracy. To increase the detection accuracy is to reduce a sensing cycle, to increase a sensing range, and to increase detection resolution.

Particularly, with the advanced driver-assistance systems and the autonomous driving systems, sensing has to be simultaneously performed for a plurality of pieces of sensor data, and thus, there is a problem of deficiency of computational resources.

Patent Literature 1 describes setting of order of priority of a plurality of sensors monitoring different regions around a vehicle on the basis of one of a traveling state of a vehicle and a state of a driver of the vehicle, and describes controlling of one of operation of a sensor and processing of information output from a sensor on the basis of the order of priority. In Patent Literature 1, recognition of the area around a vehicle is thereby performed while reducing burden on a central processing unit (CPU) and an in-vehicle LAN, in the case of using a plurality of sensors.

CITATION LIST

Patent Literature

Patent Literature 1: WO 2010/140239 A

SUMMARY OF INVENTION

Technical Problem

However, according to the technique of Patent Literature 1, a large amount of computational resources is used for a sensing process with a high priority, and computational resources to be allocated to a sensing process with a low priority become deficient. As a result, an object which is supposed to be recognized is possibly not recognized.

The present invention is aimed to appropriately recognize an object in the area around a moving body within available computational resources.

Solution to Problem

A peripheral recognition device according to the present invention includes:

a control unit to determine, based on a moving environment of a moving body, an allocation rate of computational resources to be allocated to each of a plurality of sensing processes of analyzing sensor data output from a plurality of sensors that observe an area around the moving body; and a detection unit to detect an object in the area around the moving body by using, for a corresponding sensing process, computational resources of an allocated amount specified based on the allocation rate determined by the control unit.

ADVANTAGEOUS EFFECTS OF INVENTION

The present invention determines an allocation rate of computational resources for each sensing process according to a moving environment of a moving body, and detects an object by using an allocated amount of computational resources specified by the determined allocation rate. An object in the area around a moving body can thereby be appropriately recognized within available computational resources.

BRIEF DESCRIPTION OF DRAWINGS

FIG. 5 is an allocation rate table 411 illustrating an allocation rate of computational resources required for each level of accuracy of a sensing process, according to the first embodiment.

FIG. 6 is a distribution table 412 illustrating distribution of computational resources according to a traveling environment, according to the first embodiment.

FIG. 12 is an allocation rate table 411 illustrating an allocation rate of computational resources required for each level of accuracy of a sensing process, according to the third embodiment.

FIG. 13 is an explanatory diagram of circuit data 43 according to the third embodiment.

DESCRIPTION OF EMBODIMENTS

First Embodiment

*Description of Configuration*

Figure 1:
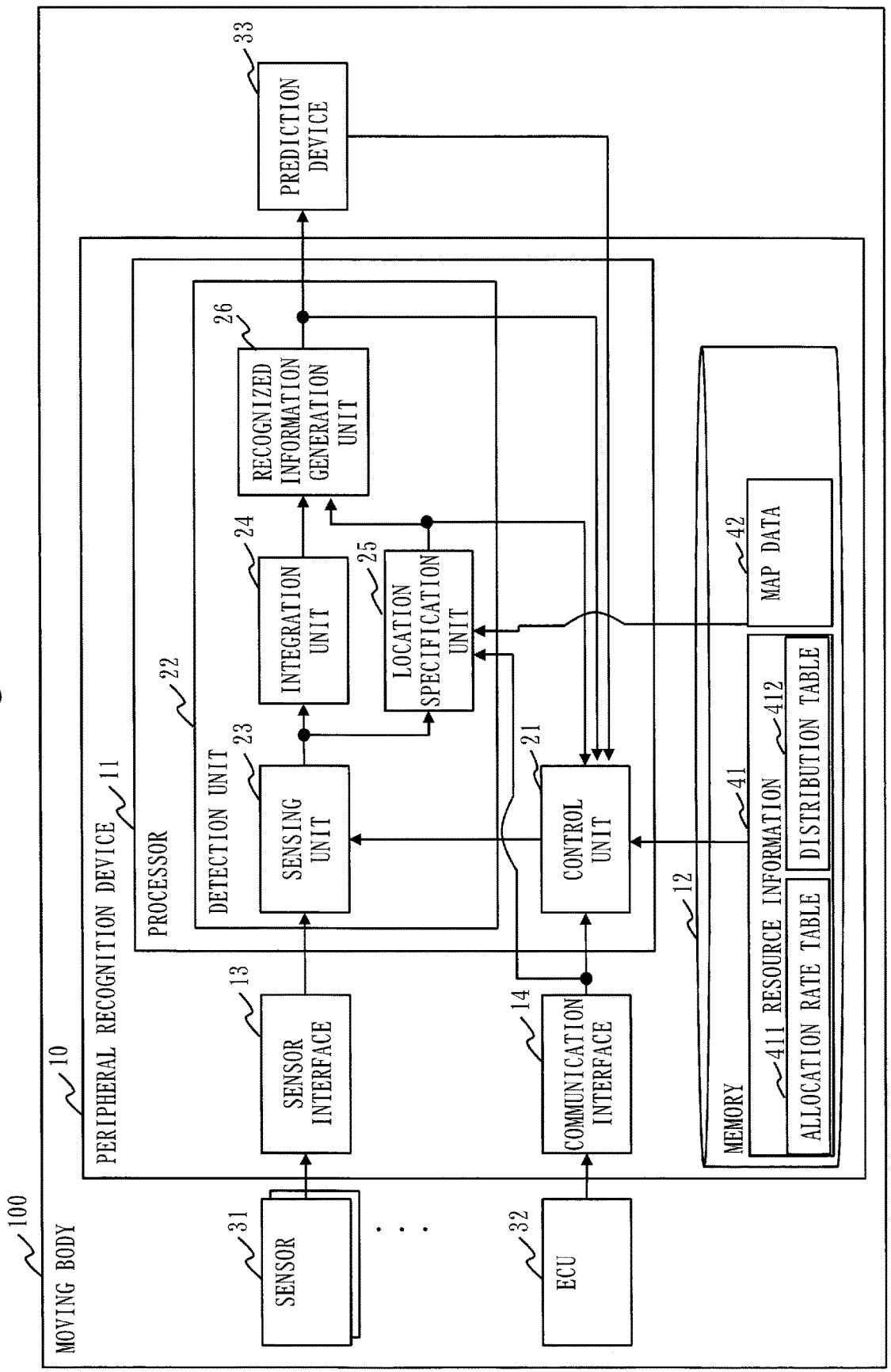
FIG. 1 is a configuration diagram of a peripheral recognition device 10 according to a first embodiment.

Referring to FIG. 1, a configuration of a peripheral recognition device 10 according to a first embodiment will be described.

FIG. 1 illustrates a state where the peripheral recognition device 10 is mounted on a moving body 100. The moving body 100 is a vehicle, a vessel, or a pedestrian. In the first embodiment, the moving body 100 is a vehicle.

Additionally, the peripheral recognition device 10 may be mounted while being integrated with or inseparable from the moving body 100 or other illustrated structural elements, or may be mounted while being detachable or separable from the moving body 100 or other illustrated structural elements.

The peripheral recognition device 10 is computer that is mounted on the moving body 100.

The peripheral recognition device 10 includes pieces of hardware including processor 11, a memory 12, a sensor interface 13, and a communication interface 14. The processor 11 is connected to other pieces of hardware by a system bus, and controls the other pieces of hardware.

The processor 11 is an integrated circuit (IC) for performing processing. Specific examples of the processor 11 include a CPU, a digital signal processor (DSP), and a graphics processing unit (GPU).

FIG. 1 illustrates only one processor 11. However, a plurality of processors 11 may be provided, and the plurality of processors 11 may coordinate to execute a program for realizing each function. In the first embodiment, the processor 11 includes a CPU, a DSP, and a GPU, and these coordinate to execute a program for realizing each function.

The CPU is a processor for executing programs, and performing processing such as data calculation.

The DSP is a processor dedicated to digital signal processing, such as arithmetic calculation and data transfer. For example, processing of a digital signal, such as sensing of sensor data obtained from a sonar, is desirably processed at a fast speed by the DSP, instead of the CPU.

The GPU is a processor dedicated to processing images, and is a processor which realizes fast processing by processing a plurality of pieces of pixel data in parallel, and which is capable of performing processing, such as template matching, which is frequently used in image processing at a fast speed. For example, if sensing of sensor data obtained from a camera is performed by the CPU, the processing time becomes very long, and thus, such processing is desirably performed by the GPU.

The memory 12 is configured of a non-volatile memory which is capable of holding execution programs and data when power of the peripheral recognition device 10 is switched off, and a volatile memory which is capable of transferring data at a high speed during operation of the peripheral recognition device 10. Specific examples of the non-volatile memory include a hard disk drive (HDD), a solid state drive (SSD), and a flash memory. Specific examples of the volatile memory include a double-data-rate2 synchronous dynamic random access memory (DDR2-SDRAM), and a double-data-rate3 synchronous dynamic random access memory (DDR3-SDRAM). The non-volatile memory may be a portable storage medium such as a secure digital (SD) memory card, a compact flash (CF), a NAND flash, a flexible disk, an optical disk, a compact disc, a Blu-ray (registered trademark) disc, or a DVD.

The memory 12 is connected to the processor 11 through a memory interface. The memory interface is a device for performing efficient memory access control by collectively managing memory accesses from the processor 11. The memory interface is used for processing such as data transfer between functional elements described later, and writing of sensor data in the memory 12.

The sensor interface 13 is a device for connecting a sensor 31 mounted on the moving body 100. Specific examples of the sensor interface 13 include a terminal of an interface compatible with communication standards such as Ethernet (registered trademark), I-squared-C (I2C), serial peripheral interface (SPI), video signals, and controller area network (CAN).

A plurality of sensors 31 for observing the area around the moving body 100 are mounted on the moving body 100. Specific examples of the sensor 31 include a camera, a sonar, a laser sensor, and a global positioning system (GPS) sensor. The types and number of sensors 31 are determined according to required object detection accuracy and cost.

The communication interface 14 is a device for connecting an electronic control unit (ECU) 32 mounted on the moving body 100. Specific examples of the communication interface 14 include terminals of Ethernet, controller area network (CAN), RS232C, USB, and IEEE1394.

The ECU 32 is a device for acquiring vehicle speed information indicating the speed of the moving body 100, steering angle information, and temperature information indicating the temperature of the area around the moving body 100.

The peripheral recognition device 10 includes a control unit 21 and a detection unit 22 as functional structural elements. The detection unit 22 includes a sensing unit 23, an integration unit 24, a location specification unit 25, and a recognized information generation unit 26. Functions of the control unit 21, the detection unit 22, the sensing unit 23, the integration unit 24, the location specification unit 25, and the recognized information generation unit 26 are realized by software.

Programs for realizing the functions of respective units are stored in the memory 12. The programs are read and executed by the processor 11.

The memory 12 also stores resource information 41 and map data 42. The resource information 41 includes an allocation rate table 411 indicating an allocation rate of computational resources required for each level of accuracy of the sensing process, and a distribution table 412 indicating distribution of computational resources according to a traveling environment. The map data 42 is configured of static map data and dynamic map data. The static map data indicates the number of lanes on a road, the width of a lane, a shape, a gradient, a road sign, a traffic light, and the like. The dynamic map data indicates a situation which changes dynamically, and is congestion information, regulation information, traffic accident information, roadworks information, and the like.

Information, data, signal values, and variable values indicating processing results of the functions of the units of the peripheral recognition device 10 are stored in the memory 12, or a register or a cache memory in the processor 11. In the following description, information, data, signal values, and variable values indicating processing results of the functions of the units of the peripheral recognition device 10 are assumed to be stored in the memory 12.

Furthermore, the peripheral recognition device 10 is connected to a prediction device 33 mounted on the moving body 100. The prediction device 33 is a device for estimating a risk distribution and a surrounding situation from information recognized by the peripheral recognition device 10, and for determining travel details of the moving body 100 from the estimated risk distribution and surrounding situation. Moreover, the prediction device 33 is a device for operating the moving body 100 according to the determined travel details.

The risk distribution indicates a position and a level of a risk, taking the location of the moving body 100 as a point of origin. The surrounding situation indicates behavior, movement, acceleration/deceleration and the like of an object in the area around the moving body 100. The travel details indicate a travel route, a lane, a lane change location, and the like.

\*\*\*Description of Operation\*\*\*

Referring to FIGS. 2 to 6, an operation of the peripheral recognition device 10 according to the first embodiment will be described.

An operation of the peripheral recognition device 10 according to the first embodiment corresponds to a peripheral recognition method according to the first embodiment. Furthermore, the operation of the peripheral recognition device 10 according to the first embodiment corresponds to processing of a peripheral recognition program according to the first embodiment.

Figure 2:
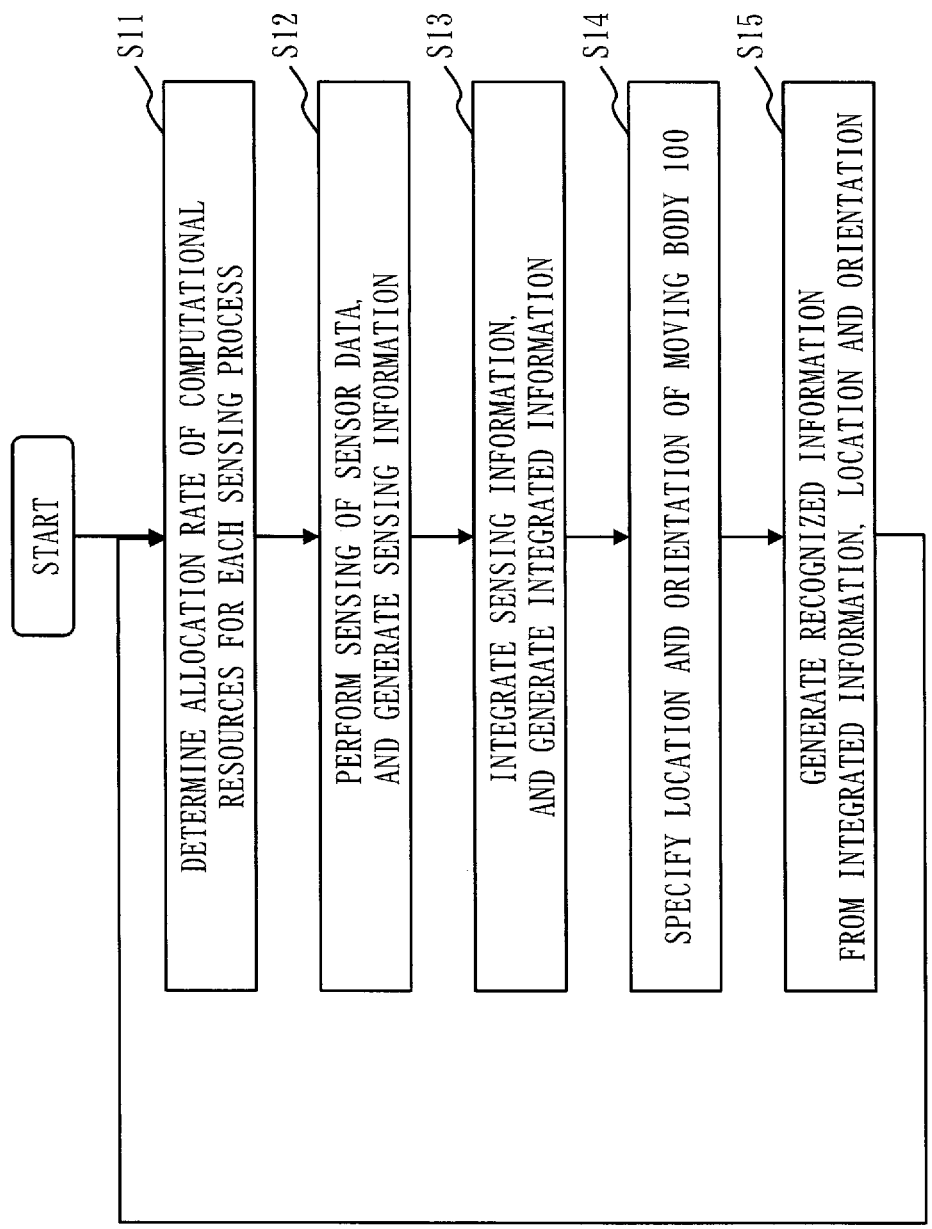
FIG. 2 is a flowchart of a basic operation of the peripheral recognition device 10 according to the first embodiment.

Referring to FIG. 2, a basic operation of the peripheral recognition device 10 according to the first embodiment will be described.

(Step S11: Resource Control Process)

The control unit 21 determines an allocation rate of computational resources to be allocated to each of a plurality of sensing processes of analyzing sensor data output from a plurality of sensors for observing the area around the moving body.

In the first embodiment, the computational resources are the processor 11 and the memory 12. Accordingly, the allocation rate of computational resources indicates a proportion of an allocated amount to available capacities of the processor 11 and the memory 12.

(Step S12: Sensing Process)

The sensing unit 23 performs sensing of sensor data output from the sensor 31, by using computational resources of an allocated amount, for the corresponding sensing, specified based on the allocation rate determined in step S11, and detects objects, such as obstacles and road signs, in a monitoring area. The sensing unit 23 generates sensing information indicating a detected object.

Specifically, for example, the sensing unit 23 analyzes image data which is sensor data output from two front cameras for capturing front of the moving body 100, and detects an object indicated by the image data. Furthermore, the sensing unit 23 detects a distance to the detected object by a stereo method, based on the image data output from each of the two front cameras. Then, the sensing unit 23 generates the sensing information indicating the detected object and the specified distance to the object.

(Step S13: Integration Process)

The integration unit 24 integrates the sensing information generated in step S12, and generates integrated information with a large amount of information and with high accuracy.

Specifically, for example, it is assumed that presence of a person about 10 meters in front is specified, in step S12, as a result of performing sensing on the image data output from the two front cameras. Moreover, it is assumed that presence of an obstacle 10.2 meters in front is specified, in step S12, as a result of performing sensing on sensor data output from a laser sensor. In this case, the integration unit 24 integrates the two pieces of sensing information, and generates integrated information indicating presence of a person 10.2 meters in front.

(Step S14: Location Specification Process)

The location specification unit 25 specifies location and orientation of the moving body 100 based on various pieces of information about the moving body 100 acquired from the ECU 32 through the communication interface 14, the sensing information generated in step S12, and the map data 42 stored in the memory 12.

Specifically, for example, the location specification unit 25 specifies, based on a location indicated by the sensing information and the map data 42 for the location, that the moving body 100 is traveling on a lane closest to the center on a road with three lanes each way. Furthermore, the location specification unit 25 specifies, based on the steering angle information included in the information acquired from the ECU 32, that the moving body 100 is tilted two degrees to the right.

(Step S15: Recognized Information Generation Process)

The recognized information generation unit 26 generates, based on the integrated information generated in step S13 and the location and orientation specified in step S14, recognized information mapping location, attribute and size of an object such as an obstacle, a road sign or a traffic light in a three-dimensional space around the moving body 100.

Specific examples of the attribute include a person, a road sign, a traffic light, an oncoming vehicle, a vehicle in front, and the like. Additionally, in the case of an object, the state of which changes, such as a traffic light, the state of the object, or the color in the case of a traffic light, may be included as the attribute. Specifically, for example, a three-dimensional space is a three-dimensional space which takes a traveling direction as an X-axis, a lateral direction as a Y-axis, and a vertical direction as a Z-axis, with a certain point on the moving body 100 as a point of origin. By mapping pieces of information obtained by the plurality of sensing processes in one spatial coordinate system, what object is present in what state and at which location when seen from the moving body 100 can be indicated.

Processes from step S12 to step S15 are collectively referred to as a detection process.

Then, the prediction device 33 estimates the risk distribution and the surrounding situation based on the recognized information generated in step S15, and determines travel details of the moving body 100 from the estimated risk distribution and surrounding situation. Then, the prediction device 33 operates the moving body 100 based on the determined travel details.

Figure 3:
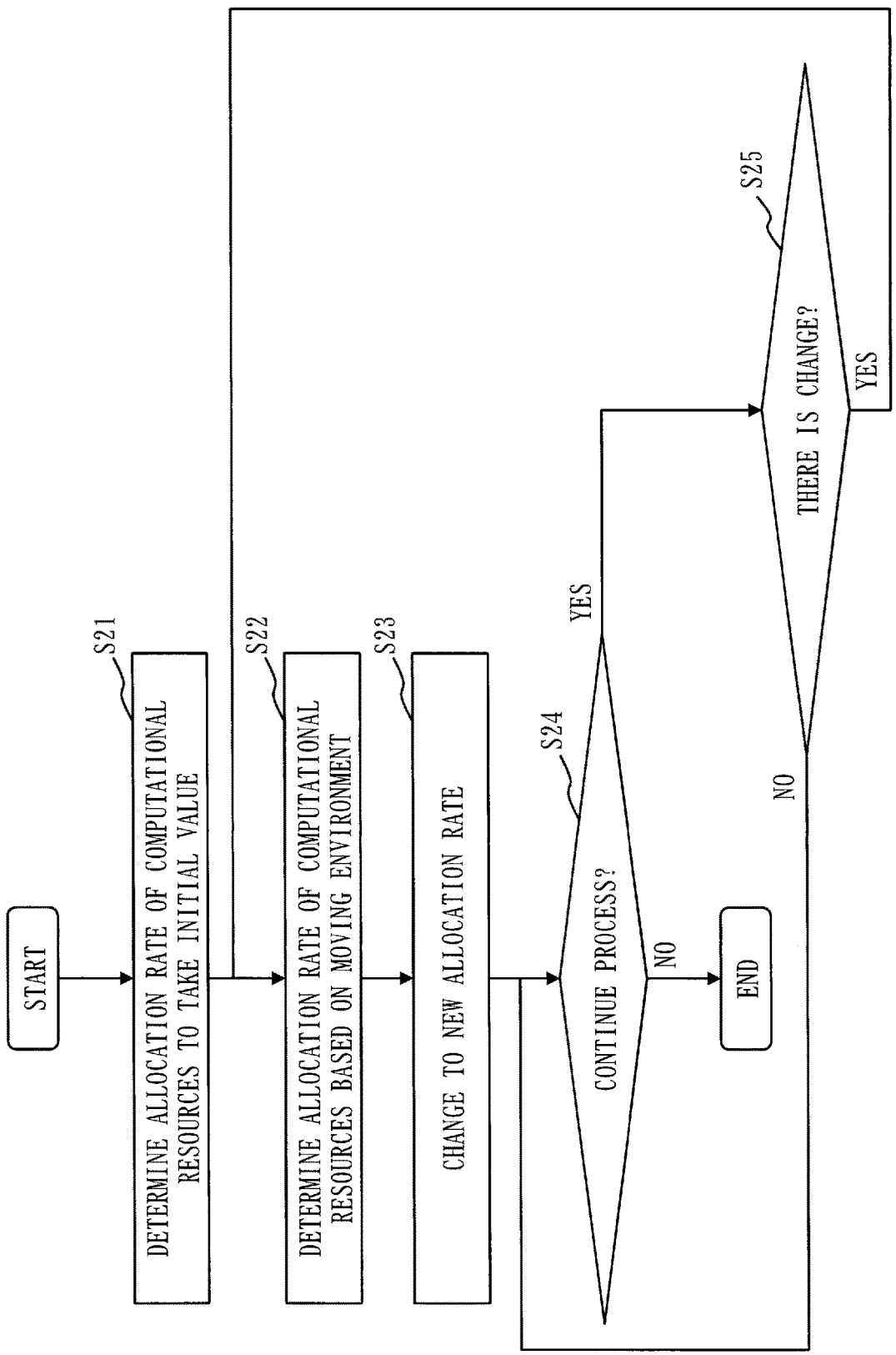
FIG. 3 is a flowchart of a resource control process according to the first embodiment.
Figure 4:
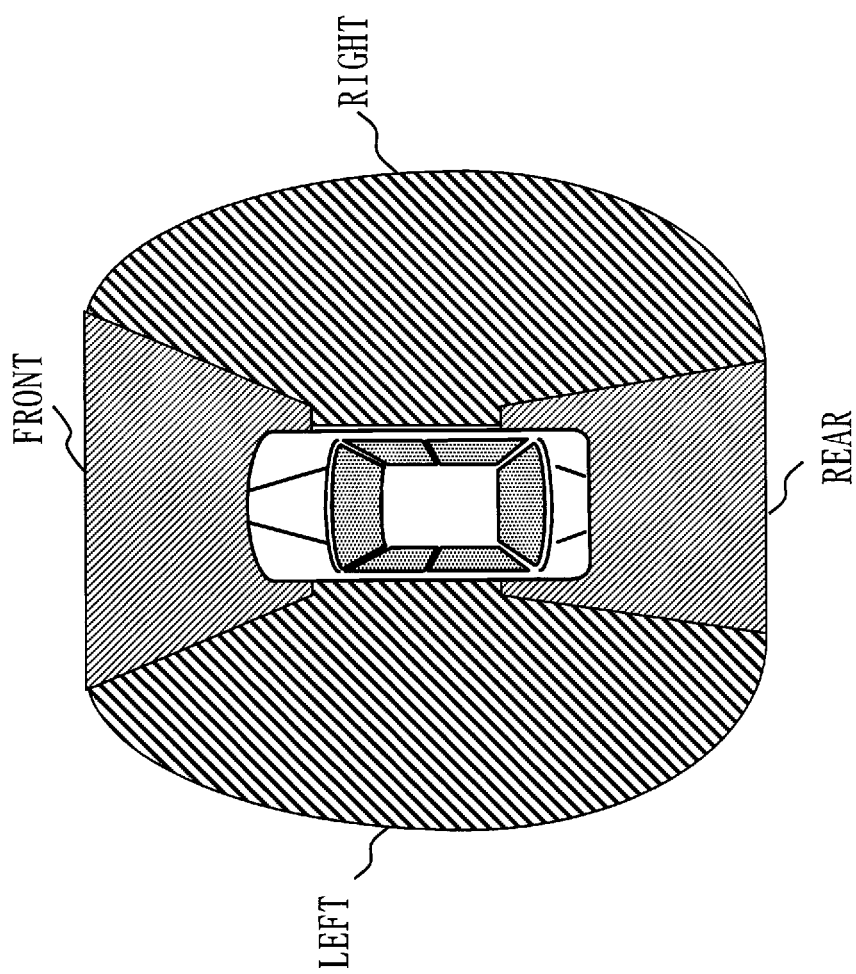
FIG. 4 is an explanatory diagram of a sensing area according to the first embodiment.

Referring to FIG. 3, the resource control process in step S11 according to the first embodiment will be described.

(Step S21: Initialization Process)

When the peripheral recognition device 10 starts processing, the control unit 21 reads, from the resource information 41, an initial value of an allocation rate of computational resources allocated to each of a plurality of sensing processes. Then, the control unit 21 determines the initial value, which is read out, as the allocation rate of computational resources.

In the first embodiment, a description is given of an example where the area around a vehicle, which is the moving body 100, is classified into four areas of front, rear, left, and right, and sensing is performed by one sensor in each area. In the description below, sensing on the front side will be referred to as "front sensing", sensing on the left side as "left sensing", sensing on the right side as "right sensing", and sensing on the rear side as "rear sensing". As illustrated in FIG. 5, the control unit 21 reads, from the allocation rate table 411 in the resource information 41, the allocation rate for the level of accuracy set as the initial value for each of the plurality of sensing processes. For example, the allocation rate for class A is read out for each of the front sensing, the left sensing, the right sensing, and the rear sensing.

Then, step S12 in FIG. 2 is performed based on the allocated amounts specified from the determined allocation rates of computational resources. Then, steps S13 to S15 in FIG. 2 are accordingly performed.

(Step S22: Allocation Rate Reading Process)

The control unit 21 determines the allocation rate of computational resources according to a movement environment of the moving body 100. The movement environment of the moving body 100 indicates at least one of the type of a road the moving body 100 is traveling on, behavior of the moving body 100, and visibility from the moving body 100.

Specifically, as illustrated in FIG. 6, the control unit 21 reads out for each of the plurality of sensing processes, from the distribution table 412 in the resource information 41, a class corresponding to the type of the road, the behavior, and the visibility, which are the movement environment of the moving body 100. Specifically, for example, in the case where the moving body 100 is moving straight on a local road, and visibility is good thanks to the fine weather and daylight, the control unit 21 reads classes for the plurality of sensing processes in processing class 1 in FIG. 6. That is, the control unit 21 reads class C for the front sensing, class A for the left sensing, class A for the right sensing, and class C for the rear sensing.

In the first embodiment, the movement environment of the moving body 100 is specified based on various pieces of information, such as the vehicle speed information, the steering angle information, and the temperature information, about the moving body 100 and a surrounding environment of the moving body 100 acquired from the ECU 32 through the communication interface 14, the location and orientation of the moving body 100 specified in step S14 by the location specification unit 25, the recognized information generated in step S15 by the recognized information generation unit 26, and the surrounding situation determined by the prediction device 33.

For example, the control unit 21 specifies the type of the road the moving body 100 is traveling on, based on the location of the moving body 100. At this time, the control unit 21 may specify the type of the road by referring to the map data 42. Furthermore, the control unit 21 specifies the behavior of the moving body 100 based on speed and steering angle of the moving body 100 indicated by various pieces of information about the moving body 100 and the surrounding environment of the moving body 100, the location and orientation of the moving body 100, the recognized information, and the surrounding situation. Moreover, the control unit 21 specifies the visibility based on the temperature or the like indicated by various pieces of information about the moving body 100 and the surrounding environment of the moving body 100. At this time, the control unit 21 may acquire, from an external server or the like, weather information for an area including the location of the moving body 100, and may refer to the weather information and specify the visibility.

(Step S23: Allocation Change Process)

The control unit 21 changes the allocation rate of computational resources allocated to each of the plurality of sensing processes to the allocation rate of computational resources determined in step S22.

Then, step S12 in FIG. 2 is performed according to the allocation rates of computational resources after change. Then, steps S13 to S15 in FIG. 2 are accordingly performed.

(Step S24: Continuance Determination Process)

The control unit 21 determines whether or not to continue the detection process from step S12 to step S15 in FIG. 2.

In the case of continuing the detection process, the control unit 21 proceeds to step S25, and in the case of not continuing the detection process, the control unit 21 ends the process.

(Step S25: Situation Determination Process)

The control unit 21 determines whether or not the traveling environment is changed.

In the case where the traveling environment is changed, the control unit 21 returns to step S22. In the case where the traveling environment is not changed, the control unit 21 returns to step S24.

Advantageous Effects of First Embodiment

As described above, the peripheral recognition device 10 according to the first embodiment determines the allocation rate of computational resources to be allocated to each of a plurality of sensing processes, according to the movement environment of the moving body 100. An object in the area around the moving body may thereby be appropriately recognized within available computational resources.

*Other Configurations*

<First Modification>

In step S25 in FIG. 3, with respect to each of the traveling environment and the risk distribution, occurrence of a change may be determined only when there is a change at or above a threshold, and a subtle change may be determined as no change. Frequent occurrence of re-distribution of the allocation rate of computational resources caused by determination of occurrence of a change based on a subtle change may thereby be prevented, and inefficient sensing control may thus be prevented.

Second Embodiment

A second embodiment is different from the first embodiment in that the allocation rate of computation resources is determined further taking into account the risk distribution. This difference will be described in the second embodiment.

*Description of Operation*

Figure 7:
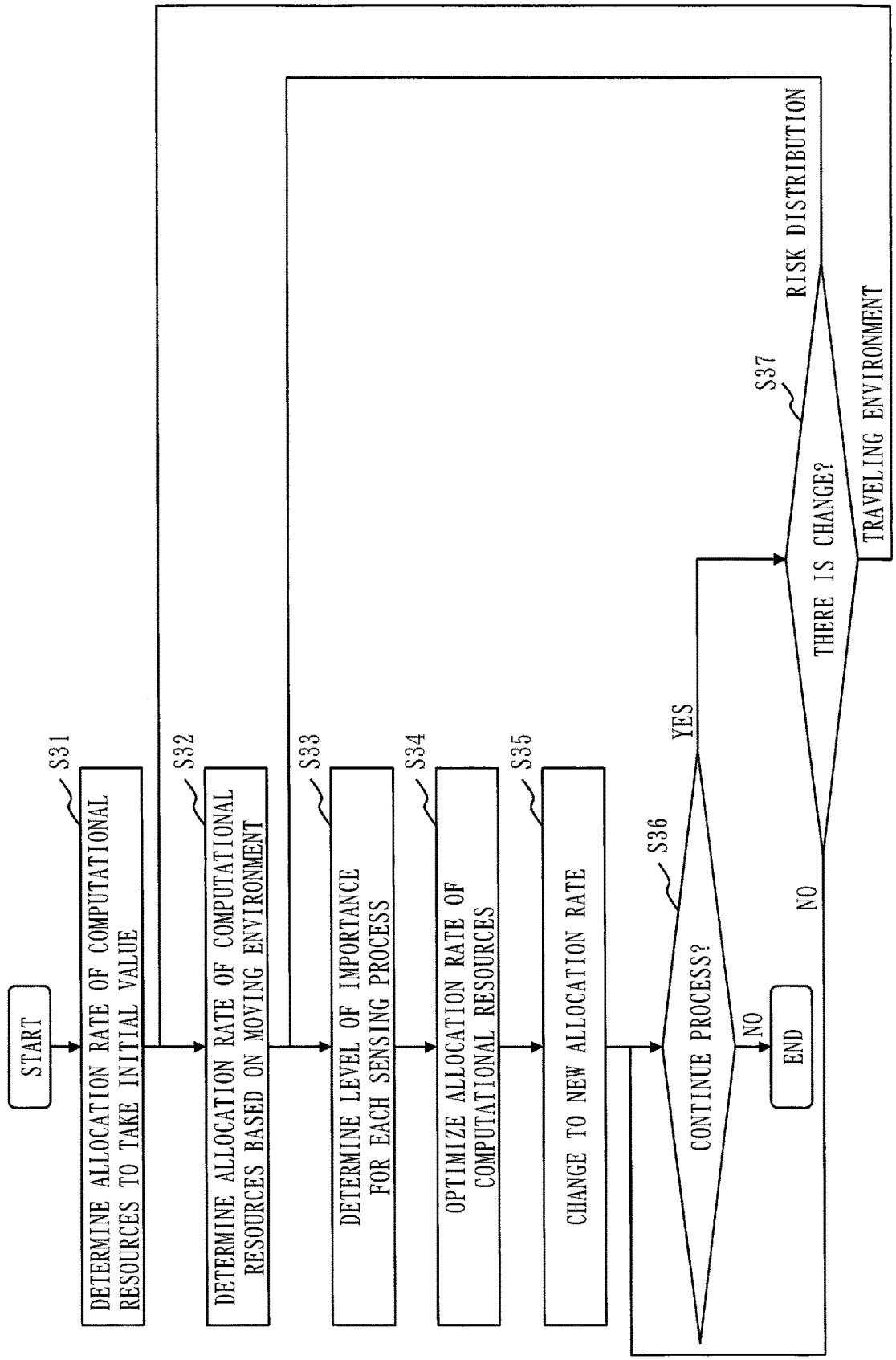
FIG. 7 is a flowchart of a resource control process according to a second embodiment.
Figure 8:
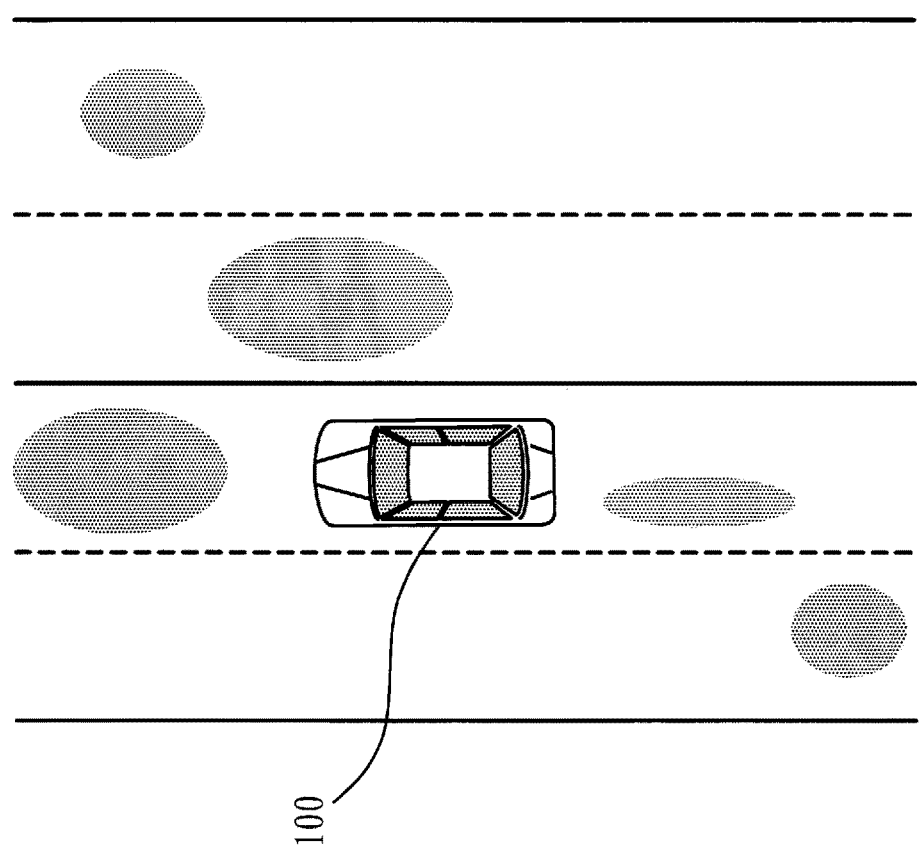
FIG. 8 is an explanatory diagram of a risk distribution according to the second embodiment.
Figure 9:
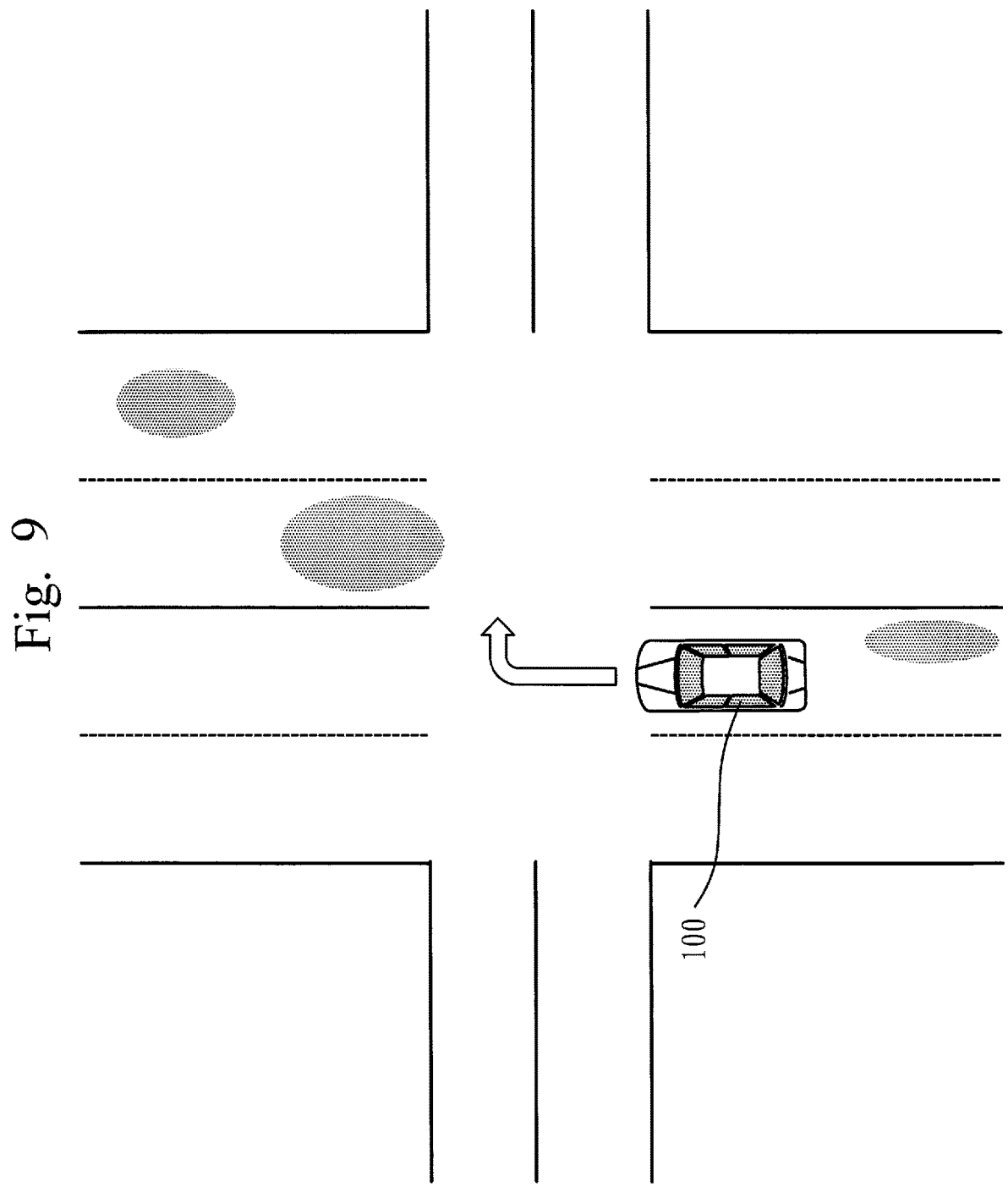
FIG. 9 is an explanatory diagram of a risk distribution according to the second embodiment.

Referring to FIGS. 7 to 9, an operation of a peripheral recognition device 10 according to the second embodiment will be described.

An operation of the peripheral recognition device 10 according to the second embodiment corresponds to a peripheral recognition method according to the second embodiment. Furthermore, the operation of the peripheral recognition device 10 according to the second embodiment corresponds to processing of a peripheral recognition program according to the second embodiment.

Referring to FIG. 7, a resource control process according to the second embodiment will be described.

Processes in steps S31 and S32, and a process in step S36 are the same as the processes in steps S21 and S22, and step S24 in FIG. 3.

(Step S33: Importance Determination Process)

The control unit 21 determines a level of importance of each of a plurality of sensing processes based on a risk distribution around the moving body 100 estimated by the prediction device 33. The control unit 21 determines that the higher the risk in an area, the higher the level of importance of sensing. Additionally, the risk distribution is not limited to be acquired from the prediction device 33, and may be acquired from another device such as a roadside device.

The risk distribution indicates a position and a level of a risk in two-dimensional spatial coordinates or three-dimensional spatial coordinates, taking the moving body 100 as a point of origin. Specifically, for example, the level of a risk is calculated based on a probability of an object entering a travel route indicated by travel details generated by the prediction device 33, and a level of impact in case of collision. Specifically, for example, the level of impact is calculated based on the type of the object, vehicle speed, weight, and the like.

At this time, the control unit 21 may determine the level of importance by further taking into account the surrounding situation estimated by the prediction device 33. The surrounding situation indicates behavior, movement, acceleration/deceleration and the like of an object in the area around the moving body 100.

Specifically, for example, the risk distribution in a case of traveling straight on a road with two lanes each way is as illustrated in FIG. 8. In FIG. 8, it is indicated that the level of risk is high at shaded spots. In FIG. 8, spots where a vehicle in front, an oncoming vehicle, a motorcycle in the rear, and the like, which are detected, are present are illustrated as spots with a high level of risk. Moreover, as another specific example, the risk distribution in a case of turning right at an intersection is as illustrated in FIG. 9. Also in FIG. 9, it is indicated that the level of risk is high at shaded spots. In FIG. 9, spots where an oncoming vehicle and a following vehicle, which are detected, are present, and a spot which is hidden by the detected oncoming vehicle and which cannot be seen are illustrated as spots with a high level of risk.

(Step S34: Optimization Process)

The control unit 21 optimizes the allocation rate of computational resources based on the allocation rate of computational resources determined in step S32 and the level of importance determined in step S33.

Specifically, the control unit 21 optimizes and finally determines the allocation rate of computational resources by increasing, with respect to sensing in an area with a high level of risk indicated by the risk distribution around the moving body 100, the allocation rate of computational resources determined (provisionally determined) in step S32.

Specifically, for example, it is assumed that classes in processing class 6 in FIG. 6 are read out in step S32. In this case, the front sensing is in class I, and uses 26% of the available computational resources. The left sensing is in class I, and uses 18% of the available computational resources. The right sensing is in class I, and uses 18% of the available computational resources. The rear sensing is in class I, and uses 22% of the available computational resources. Accordingly, the total of computational resources used by the sensing processes is 84% of the available computational resources.

It is assumed that the front sensing is determined in step S33 to be important. In this case, the control unit 21 changes the allocation rate of computational resources for the front sensing to any of the allocation rates in class J, class K, and class L with higher levels of accuracy than that in class I determined in step S32. At this time, the control unit 21 selects a class with the highest level of accuracy within a range where the total of computational resources used by the sensing processes does not exceed 100%. In this case, the total is 92% even with class L with the highest level of accuracy, and does not exceed 100%, and thus, the control unit 21 changes the allocation rate of computational resources for the front sensing to the allocation rate in class L.

In this case, the front sensing is the only sensing process with a high level of importance, but in the case where two or more sensing processes are determined to have a high level of importance, control may be performed in such a way that the level of accuracy of sensing in an area with the highest level of importance is increased as much as possible within the available computational resources, or in such a way that the levels of accuracy are increased in a balanced manner according to the levels of importance.

Furthermore, to suppress power consumption, the control unit 21 may perform control to achieve a minimum required level of accuracy. That is, in the description given above, a class with a highest level of accuracy is selected within a range where the total of computations resources used by the sensing processes does not exceed 100%, but the control unit 21 may select a class with a minimum required level of accuracy according to the level of importance.

(Step S35: Allocation Change Process)

The control unit 21 changes the allocation rate of computational resources allocated to each of a plurality of sensing processes to the allocation rate of computational resources finally determined in step S35.

Then, step S12 in FIG. 2 is performed based on the allocated amounts specified from the allocation rates of computational resources after change. Then, steps S13 to S15 in FIG. 2 are accordingly performed.

(Step S37: Situation Determination Process)

The control unit 21 determines whether or not at least one of the traveling environment and the risk distribution is changed.

In the case where only the traveling environment is changed, or in the case where both the traveling environment and the risk distribution are changed, the control unit 21 returns to step S32. In the case where only the risk distribution is changed, the control unit 21 returns to step S33. In the case where neither is changed, the control unit 21 returns to step S36.

Advantageous Effects of Second Embodiment

As described above, the peripheral recognition device 10 according to the second embodiment determines the allocation rate of computational resources according to the risk distribution around the moving body. An object necessary to avoid risks may thereby be appropriately recognized within available computational resources.

Third Embodiment

A third embodiment is different from the first and second embodiments in that respective functions of the units of a peripheral recognition device 10 are realized by hardware. A description will be given regarding this difference, with respect to the third embodiment.

In the third embodiment, differences to the second embodiment will be described, but respective functions of the units may be realized by hardware also in the first embodiment.

*Description of Configuration*

Figure 10:
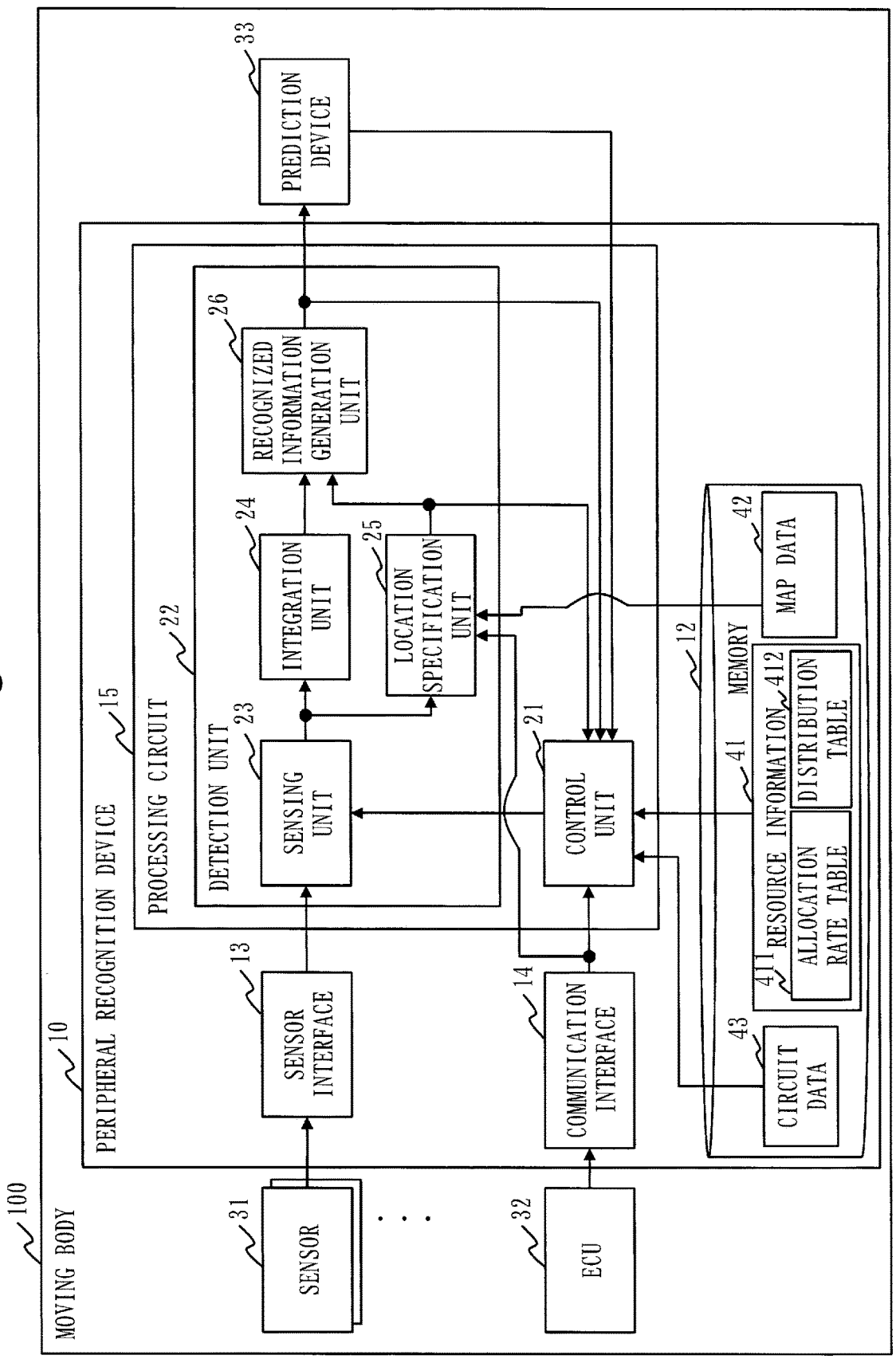
FIG. 10 is a configuration diagram of a peripheral recognition device 10 according to a third embodiment.

Referring to FIG. 10, a configuration of the peripheral recognition device 10 according to the third embodiment will be described.

The peripheral recognition device 10 includes a processing circuit 15, instead of the processor 11.

The processing circuit 15 is an electronic circuit for realizing the function of each unit of the peripheral recognition device 10. In FIG. 10, only one processing circuit 15 is illustrated. However, there may be a plurality of processing circuits 15, and the plurality of processing circuits 15 may coordinate to realize each function.

In the third embodiment, the processing circuit 15 is a field-programmable gate array (FPGA). The FPGA is a large-scale integration (LSI) which is configured of a plurality of logic blocks, a plurality of arithmetic blocks, and a plurality of block RAMs (static random access memory: SRAM), and which is capable of dynamically changing a circuit configuration by switching configurations of the logic blocks and routing of wires connecting the elements.

The memory 12 further stores circuit data 43. The circuit data 43 indicates a circuit configuration for performing each of a plurality of sensing processes.

In the third embodiment, computational resources are a circuit realized by an FPGA. Accordingly, the allocated amount which is specified based on the allocation rate of computational resources indicates the scale of the circuit. The circuit data 43 indicates a circuit configuration for each class of sensing process and circuit scale.

\*\*\*Description of Operation\*\*\*

Figure 11:
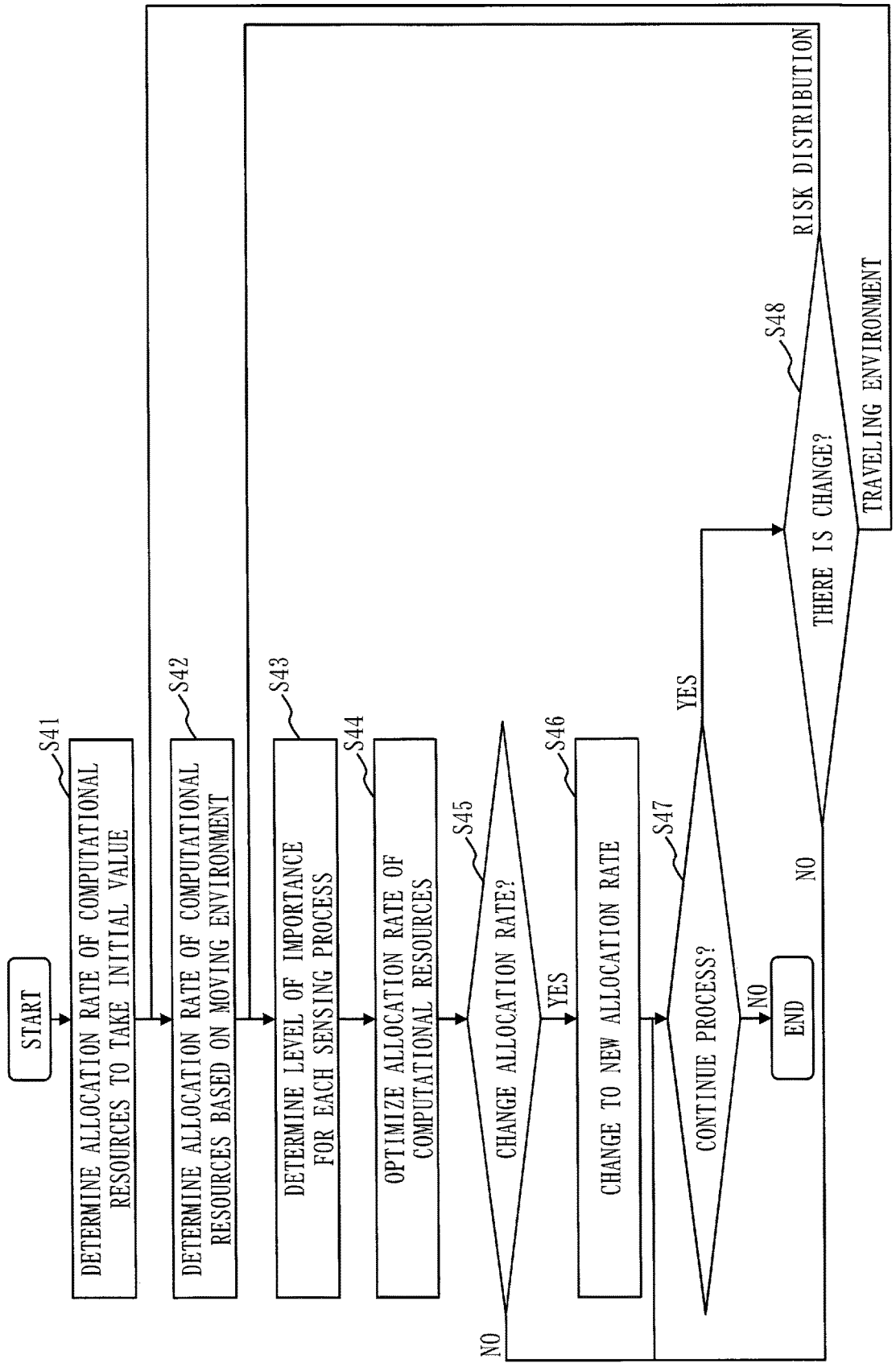
FIG. 11 is a flowchart of a resource control process according to the third embodiment.

Referring to FIGS. 11 to 13, an operation of the peripheral recognition device 10 according to the third embodiment will be described.

An operation of the peripheral recognition device 10 according to the third embodiment corresponds to a peripheral recognition method according to the third embodiment. Furthermore, the operation of the peripheral recognition device 10 according to the third embodiment corresponds to processing of a peripheral recognition program according to the third embodiment.

Referring to FIG. 11, a resource control process according to the third embodiment will be described.

Processes from steps S42 to S44, and processes in steps S47 and S48 are the same as the processes from steps S32 to S34, and the processes in steps S36 and S37 in FIG. 7.

(Step S41: Initialization Process)

As in the first embodiment, when the peripheral recognition device 10 starts processing, the control unit 21 reads, from the resource information 41, an initial value of an allocation rate of computational resources allocated to each of a plurality of sensing processes. Then, the control unit 21 determines the initial value, which is read out, as the allocation rate of computational resources. Then, the control unit 21 sets the FPGA such that the circuit configuration indicated by the circuit data 43, with respect to the circuit scale indicated by the allocated amount specified based on the determined allocation rate, is realized for each of the plurality of sensing processes.

Specifically, as illustrated in FIG. 12, the control unit 21 reads, from the allocation rate table 411 in the resource information 41, the allocation rate for the level of accuracy set as the initial value for each of the plurality of sensing processes. For example, the allocation rate for class A is read out for each of the front sensing, the left sensing, the right sensing, and the rear sensing. As illustrated in FIG. 13, the control unit 21 reads, from the circuit configuration indicated by the circuit data 43, configuration information corresponding to the circuit scale indicated by the allocated amount specified based on the allocation rate that is read out, for each of the front sensing, the left sensing, the right sensing, and the rear sensing. Then, the control unit 21 sets the FPGA such that the circuit configuration indicated by the configuration information that is read out is realized for each of the plurality of sensing processes.

Then, step S12 in FIG. 2 is performed by the FPGA that is set. Then, steps S13 to S15 in FIG. 2 are accordingly performed.

(Step S45: Change Determination Process)

The control unit 21 calculates, for each of the plurality of sensing processes, the time required to set the FPGA to the circuit configuration indicated by the circuit data 43, with respect to the circuit scale indicated by the allocated amount specified based on the allocation rate of computational resources finally determined in step S44. Then, in the case where the calculated time is shorter than a reference time, the control unit 21 determines to change the allocation rate of computational resources, and in the case where the calculated time is longer than the reference time, the control unit 21 determines not to change the allocation rate of computational resources.

In the case of changing the allocation rate of computational resources, the control unit 21 proceeds to step S46, and in the case of not changing the allocation rate of computational resources, the control unit 21 proceeds to step S47.

Specifically, the control unit 21 reads, from the allocation rate table 411 in the resource information 41 illustrated in FIG. 12, an update time for the level of accuracy determined for each of the plurality of sensing processes. Then, the control unit 21 adds up the update times which are read out. For example, it is assumed that the front sensing is changed to class D, the left sensing to class F, the right sensing to class I, and the rear sensing to class E. In this case, the update time for the front sensing is 8 [ms (milliseconds)], the update time for the left sensing is 9 [ms], the update time for the right sensing is 9 [ms], and the update time for the rear sensing is 7 [ms]. Accordingly, the total of the update times is 33 [ms].

Then, in the case where the calculated total of the update times is shorter than the reference time, the control unit 21 determines to change the allocation rate of computational resources, and in the case where the calculated total is longer than the reference time, the control unit 21 determines not to change the allocation rate of computational resources. The reference time is determined for each traveling environment. Specifically, for example, in the case of traveling on a sunny day on a local road where there are no obstacles, the reference time is determined to be 40 [ms].

(Step S46: Allocation Change Process)

The control unit 21 changes the allocation rate of computational resources allocated to each of the plurality of sensing processes to the allocation rate of computational resources determined in step S44. Then, the control unit 21 sets the FPGA such that the circuit configuration indicated by the circuit data 43, with respect to the circuit scale indicated by the allocated amount specified based on the allocation rate after change, is realized for each of the plurality of sensing processes.

Then, step S12 in FIG. 2 is performed by the FPGA that is set. Then, steps S13 to S15 in FIG. 2 are accordingly performed.

Advantageous Effects of Third Embodiment

As described above, the peripheral recognition device 10 according to the third embodiment performs sensing by configuring a circuit of a scale indicated by the allocation rate of computational resources. Accordingly, even in a case where sensing is realized by a circuit, a necessary object may be appropriately recognized within available computational resources.

Although depending on the scale to be changed, a time of millisecond order is required to change the circuit configuration of the FPGA. However, the peripheral recognition device 10 according to the third embodiment does not change the circuit configuration in a case where the update time necessary to change the circuit configuration is longer than the reference time determined for each moving environment. Accordingly, occurrence of a delay in recognition of an object caused by changing the circuit configuration may be prevented.

\*\*\*Other Configurations\*\*\*

<Second Modification>

In the third embodiment, the function of each unit of the peripheral recognition device 10 is realized by hardware. However, in a second modification, one or some of the functions of the peripheral recognition device 10 may be realized by hardware, and other functions may be realized by software. In this case, the peripheral recognition device 10 includes both the processor 11 and the processing circuit 15.

Additionally, the processor 11, the memory 12, and the processing circuit 15 in the description given above are collectively referred to as "processing circuitry". That is, the function of each unit is realized by processing circuitry.

REFERENCE SIGNS LIST

10: peripheral recognition device, 11: processor, 12: memory, 13: sensor interface, 14: communication interface, 15: processing circuit, 21: control unit, 22: detection unit, 23: sensing unit, 24: integration unit, 25: location specification unit, 26: recognized information generation unit, 31: sensor, 32: ECU, 33: prediction device, 41: resource information, 42: map data, 43: circuit data, 100: moving body.

The invention claimed is:

1. A peripheral recognition device comprising:
processing circuitry to:
determine, based on a moving environment of a moving body, an allocation rate of computational resources to be allocated to each of a plurality of sensing processes of analyzing sensor data output from a plurality of sensors that observe an area around the moving body by reading allocation rates corresponding to the moving environment of the moving body from a distribution table determined according to the moving environment, such that a sum of allocation rates of the computational resources to be allocated to the plurality of sensing processes does not exceed 100 percent; and
detect an object in the area around the moving body by using, for a corresponding sensing process, computational resources of an allocated amount specified based on available capacity of computational resources and the determined allocation rate,
wherein the processing circuitry repeats the determination of the allocation rate of computational resources to be allocated to each of the sensing processes, thus changing the allocation of resources to the respective plurality of sensing processes, in response to a change to the moving environment not involving the detection of a potentially colliding object.

2. The peripheral recognition device according to claim 1, wherein the processing circuitry determines the allocation rate based on the moving environment and a risk distribution around the moving body.

3. The peripheral recognition device according to claim 2, wherein the processing circuitry provisionally determines the allocation rate based on the moving environment, and finally determines the allocation rate by increasing, for a sensing process in an area with a high level of risk indicated by the risk distribution around the moving body, the allocation rate that is provisionally determined.

4. The peripheral recognition device according to claim 1, wherein the moving environment indicates at least one of a type of a road where the moving body travels, behavior of the moving body, and visibility from the moving body.

5. The peripheral recognition device according to claim 1, wherein
the allocated amount indicates a circuit scale representing a particular number or percentage of logic blocks, arithmetic blocks, and/or memory blocks within a processing circuit.

6. The peripheral recognition device according to claim 5, wherein
the processing circuitry configures a circuit that performs each of the plurality of sensing processes on the circuit scale indicated by the allocated amount, and
detects an object in the area around the moving body by using the circuit that is configured.

7. The peripheral recognition device according to claim 6, wherein the processing circuitry newly determines the allocation rate in a case where there is a change at or above a threshold in the moving environment.

8. A peripheral recognition method comprising:
determining, based on a moving environment of a moving body, an allocation rate of computational resources to be allocated to each of a plurality of sensing processes of analyzing sensor data output from a plurality of sensors that observe an area around the moving body by reading allocation rates corresponding to the moving environment of the moving body from a distribution table determined according to the moving environment, such that a sum of allocation rates of the computational resources to be allocated to the plurality of sensing processes does not exceed 100 percent; and
detecting an object in the area around the moving body by using, for a corresponding sensing process, computational resources of an allocated amount specified based on available capacity of computational resources and the allocation rate that is determined,
wherein the method repeats the determination of the allocation rate of computational resources to be allocated to each of the sensing processes, thus changing the allocation of resources to the respective plurality of sensing processes, in response to a change to the moving environment not involving the detection of a potentially colliding object.

9. A non-transitory computer readable medium storing a peripheral recognition program for causing a computer to execute:
a control process of determining, based on a moving environment of a moving body, an allocation rate of computational resources to be allocated to each of a plurality of sensing processes of analyzing sensor data output from a plurality of sensors that observe an area around the moving body by reading allocation rates corresponding to the moving environment of the moving body from a distribution table determined according to the moving environment, such that a sum of allocation rates of the computational resources to be allocated to the plurality of sensing processes does not exceed 100 percent; and
a detection process of detecting an object in the area around the moving body by using, for a corresponding sensing process, computational resources of an allocated amount specified based on available capacity of computational resources and the allocation rate determined in the control process, wherein the peripheral recognition program causes the computer to repeat the determination of the allocation rate of computational resources to be allocated to each of the sensing processes, thus changing the allocation of resources to the respective plurality of sensing processes, in response to a change to the moving environment not involving the detection of a potentially colliding object.

* * * * *